(12) United States Patent
Coughlan et al.

(10) Patent No.: US 8,041,344 B1
(45) Date of Patent: Oct. 18, 2011

(54) COOLING OFF PERIOD PRIOR TO SENDING DEPENDENT ON USER'S STATE

(75) Inventors: Marc Coughlan, Balmain (AU); Ralph Warta, Gladesville (AU); Peter D. Runcie, Bilgola Plateau (AU); Ciaran Gannon, Sydney (AU); Alex Forbes, Westleigh (AU)

(73) Assignee: Avaya Inc., Basking Ridge, NJ (US)

( * ) Notice: Subject to any disclaimer, the term of this patent is extended or adjusted under 35 U.S.C. 154(b) by 829 days.

(21) Appl. No.: 11/768,567

(22) Filed: Jun. 26, 2007

(51) Int. Cl.
H04M 3/42 (2006.01)
H04W 4/00 (2009.01)

(52) U.S. Cl. .................. 455/414.1; 455/432.2

(58) Field of Classification Search ............. 455/414, 455/414.1, 432.3
See application file for complete search history.

(56) References Cited

U.S. PATENT DOCUMENTS

| | | | |
|---|---|---|---|
| 4,156,423 A | 5/1979 | Friedman et al. | |
| 4,468,804 A | 8/1984 | Kates et al. | |
| 4,696,039 A | 9/1987 | Doddington | |
| 4,838,275 A | 6/1989 | Lee | |
| 4,852,170 A | 7/1989 | Bordeaux | |
| 5,018,200 A | 5/1991 | Ozawa | |
| 5,206,903 A | 4/1993 | Kohler et al. | |
| 5,583,969 A | 12/1996 | Yoshizumi et al. | |
| 5,634,086 A | 5/1997 | Rtischev et al. | |
| 5,644,680 A | 7/1997 | Bielby et al. | |
| 5,684,872 A | 11/1997 | Flockhart et al. | |
| 5,722,418 A | 3/1998 | Bro | |
| 5,796,948 A * | 8/1998 | Cohen ..................... | 709/206 |
| 5,802,149 A | 9/1998 | Hanson | |
| 5,828,747 A | 10/1998 | Fisher et al. | |
| 5,868,135 A | 2/1999 | Kaufman et al. | |
| 5,905,793 A | 5/1999 | Flockhart et al. | |
| 5,982,873 A | 11/1999 | Flockhart et al. | |
| 6,064,731 A | 5/2000 | Flockhart et al. | |
| 6,084,954 A | 7/2000 | Harless et al. | |
| 6,088,441 A | 7/2000 | Flockhart et al. | |
| 6,122,614 A | 9/2000 | Kahn et al. | |

(Continued)

FOREIGN PATENT DOCUMENTS

CA 1333425 12/1994

(Continued)

OTHER PUBLICATIONS

U.S. Appl. No. 11/388,694, filed Mar. 24, 2006, Blair et al.

(Continued)

*Primary Examiner* — Dwayne Bost
*Assistant Examiner* — Timothy Pham
(74) *Attorney, Agent, or Firm* — Sheridan Ross P.C.

(57) ABSTRACT

A determination regarding the appropriateness of sending a message can be based on one or more factors. For example, the determination can be an analysis of a message to determine the likelihood that the sender has the target physical condition and/or a likely degree or severity of the target physical condition. The analysis determines, with reference to a baseline of the user, one or more of a number of errors (spelling and/or grammar) in the message, a response time, a non-fluency level associated with the message, a spell check of the message and recipient information associated with the message. Based on this analysis, the message can be managed in accordance with one or more of sending the message after a delay, returning the message to a sender for approval, managing the message based on a profile and holding the message for management at a later time.

20 Claims, 2 Drawing Sheets

U.S. PATENT DOCUMENTS

| | | | |
|---|---|---|---|
| 6,151,571 | A | 11/2000 | Pertrushin |
| 6,163,607 | A | 12/2000 | Bogart et al. |
| 6,173,053 | B1 | 1/2001 | Bogart et al. |
| 6,178,400 | B1 | 1/2001 | Eslambolchi |
| 6,192,122 | B1 | 2/2001 | Flockhart et al. |
| 6,243,680 | B1 | 6/2001 | Gupta et al. |
| 6,259,969 | B1 | 7/2001 | Tackett et al. |
| 6,275,806 | B1 | 8/2001 | Pertrushin |
| 6,275,991 | B1 | 8/2001 | Erlin |
| 6,278,777 | B1 | 8/2001 | Morley et al. |
| 6,292,550 | B1 | 9/2001 | Burritt |
| 6,314,165 | B1 | 11/2001 | Junqua et al. |
| 6,353,810 | B1 | 3/2002 | Petrushin |
| 6,363,346 | B1 | 3/2002 | Walters |
| 6,374,221 | B1 | 4/2002 | Haimi-Cohen |
| 6,389,132 | B1 | 5/2002 | Price |
| 6,408,273 | B1 | 6/2002 | Quagliaro et al. |
| 6,427,137 | B2 | 7/2002 | Petrushin |
| 6,463,415 | B2 | 10/2002 | St. John |
| 6,480,826 | B2 | 11/2002 | Pertrushin |
| 6,643,622 | B2 | 11/2003 | Stuart et al. |
| 6,690,940 | B1 | 2/2004 | Brown et al. |
| 6,697,457 | B2 | 2/2004 | Petrushin |
| 6,766,014 | B2 | 7/2004 | Flockhart et al. |
| 6,801,888 | B2 | 10/2004 | Hejna, Jr. |
| 6,823,312 | B2 | 11/2004 | Mittal et al. |
| 6,839,669 | B1 | 1/2005 | Gould et al. |
| 6,847,714 | B2 | 1/2005 | Das et al. |
| 6,889,186 | B1 | 5/2005 | Michaelis |
| 6,940,951 | B2 | 9/2005 | Mahoney |
| 6,979,298 | B2 | 12/2005 | Vodyanoy et al. |
| 6,999,563 | B1 | 2/2006 | Thorpe et al. |
| 7,065,485 | B1 | 6/2006 | Chong-White et al. |
| 7,180,997 | B2 | 2/2007 | Knappe |
| 7,222,074 | B2 | 5/2007 | Zhou |
| 7,222,075 | B2 | 5/2007 | Petrushin |
| 7,261,691 | B1 | 8/2007 | Asomani |
| 7,267,652 | B2 | 9/2007 | Coyle et al. |
| 7,398,213 | B1 | 7/2008 | Levanon et al. |
| 7,490,085 | B2 | 2/2009 | Walker et al. |
| 2002/0084130 | A1 | 7/2002 | Der Ghazarian et al. |
| 2003/0009341 | A1 | 1/2003 | Cheng et al. |
| 2003/0096594 | A1 | 5/2003 | Naboulsi |
| 2003/0191639 | A1 | 10/2003 | Mazza |
| 2004/0039261 | A1 | 2/2004 | Bardy |
| 2004/0054263 | A1 | 3/2004 | Moerman et al. |
| 2004/0148161 | A1 | 7/2004 | Das et al. |
| 2004/0148356 | A1* | 7/2004 | Bishop et al. ............ 709/206 |
| 2004/0215453 | A1 | 10/2004 | Orbach |
| 2005/0010416 | A1 | 1/2005 | Anderson et al. |
| 2005/0065789 | A1 | 3/2005 | Yacoub et al. |
| 2005/0094822 | A1 | 5/2005 | Swartz |
| 2005/0137753 | A1 | 6/2005 | Basson et al. |
| 2005/0163302 | A1* | 7/2005 | Mock et al. ............ 379/211.02 |
| 2005/0228234 | A1 | 10/2005 | Yang |
| 2005/0241871 | A1 | 11/2005 | Stewart et al. |
| 2006/0009257 | A1 | 1/2006 | Ku |
| 2006/0020466 | A1 | 1/2006 | Cousineau et al. |
| 2006/0028556 | A1 | 2/2006 | Bunn et al. |
| 2006/0036437 | A1 | 2/2006 | Bushey et al. |
| 2006/0058697 | A1 | 3/2006 | Mochizuki et al. |
| 2006/0148490 | A1 | 7/2006 | Bates et al. |
| 2006/0167595 | A1 | 7/2006 | Breed et al. |
| 2006/0183980 | A1 | 8/2006 | Yang |
| 2006/0203992 | A1* | 9/2006 | Kim ............ 379/265.06 |
| 2006/0212195 | A1 | 9/2006 | Veith et al. |
| 2006/0229505 | A1 | 10/2006 | Mundt et al. |
| 2006/0252376 | A1 | 11/2006 | Fok |
| 2006/0271404 | A1 | 11/2006 | Brown |
| 2007/0038455 | A1 | 2/2007 | Murzina |
| 2007/0106127 | A1 | 5/2007 | Alman |
| 2007/0124135 | A1 | 5/2007 | Schultz |
| 2007/0173726 | A1 | 7/2007 | Kim et al. |

FOREIGN PATENT DOCUMENTS

| | | |
|---|---|---|
| EP | 0076687 | 4/1983 |
| EP | 0140249 | 5/1985 |
| EP | 0360265 | 3/1990 |
| JP | 10-124089 | 5/1998 |
| WO | WO 00/22611 | 4/2000 |
| WO | WO 2004/056086 | 7/2004 |

OTHER PUBLICATIONS

U.S. Appl. No. 10/882,975, filed Jun. 30, 2004, Becker et al.

Landauer et al., "An Introduction to Latent Semantic Analysis", Discourse Processes, 1998, 41 pages.

Lin et al., "Phoneme-less Hierarchical Accent Classification", HP Laboratories Palo Alto, Oct. 4, 2004, 5 pages.

Michaelis, "Speech Digitization and Compression", In W. Warkowski (Ed.), International Encyclopedia of Ergonomics and Human Factors. London: Taylor Francis, 2001, 683-686.

Watson PI, Ciccia AH, Weismer G (2003), The relation oflung volume initiation to selected acoustic properties of speech. J Acoust Soc Am 113 :2812-2819.

Novak, D Cuesta-Frau, and L. Lhotska: Speech recognition methods applied to biomedical signals processing. Engineering in Medicine and Biology Society. 2004; 1: 118-121.

Entwistle, The performance of automated speech recognition systems under adverse conditions of human exertion. Int. J. Hum.-Comput. Interact. 16 (2003) (2), pp. 127-140.

Entwistle, "Training Methods and Enrollment Techniques to Improve the Performance of Automated Speech Recognition Systems Under Conditions of Human Exertion", A Dissertation Submitted in Partial Fulfillment of The Requirements for the Degree of Doctor of Philosophy, University of South Dakota, Jul. 2005.

U.S. Appl. No. 11/508,442, filed Aug. 22, 2006, Coughlan.

U.S. Appl. No. 11/508,477, filed Aug. 22, 2006, Michaelis.

Agile Lie Detector; Available at: http://www.agilemobile.com/agile_liedetector.html; 2004; 1 page; Agilemobile.com.

Aviation Safety Investigation Report; Available at: http://64.233.167.104/search?q=cache:xL7YYq5EvwsJ:www.atsb.gov.au/aviation/pdf/200204328.
pdf+%22speech+analysis%22+%22detect%22+and+%22state+of+intoxication%22&hl=en&gl=us&ct=clnk&cd=1; Undated; 151 pages; Australian Transport Safety Bureau.

De-FIB-ulator Portable Lie Detector; Available at: http://www.sharperimage.com/us/en/catalog/product/sku_AR002; 2006; 2 pages; The Sharper Image.

Dialing Under The Influence; Available at: http://www.virginmobile.com.au/services/duti.html; 2006; 2 pages; Virgin Mobile.

Hollien H.; "Production of intoxication states by actors—acoustic and temporal characteristics."; J. Forensic Sci.; Jan. 2001; 46(1); pp. 68-73; Two-page internet summary available at http://www.ncbi.nlm.nih.gov/entrez/query.fcgi?db=pubmed&cmd=Retrieve&dopt=Abstract&list_uids=11210927&query_hl=3&itool=pubmed_ExternalLink.

Johnson K.; "Do voice recordings reveal whether a person is intoxicated? A case study."; Phonetica; 1990; 47(3-4); pp. 215-237; One-page internet summary available at http://www.ncbi.nlm.nih.gov/entrez/query.fcgi?db=pubmed&cmd=Retrieve&dopt=Abstract&list_uids=2130381&query_hl=5&itool=pubmed_ExternalLink.

Lie Detection and a Major Breakthrough in Price and Portability!; Available at: http://www.pimall.com/nais/e.pse.html; 2006; Thomas Investigative Publications, Inc.; Austin, TX.

Module 3; Available at: http://www.dendrites.com/mod3r.html; Undated; 244 pages.

Module 4, Autonomic Nervous System: Clinical Implications and Non Pharmaceutical Applications.; Available at: http://www.dendrites.com/module4.htm; Undated; 39 pages.

Pisoni DB.; "Effects of alcohol on the acoustic-phonetic properties of speech: perceptual and acoustic analyses."; Alcohol Clin Exp Res.; Aug. 1989; 13(4); pp. 577-587; One-page internet summary available at http://www.ncbi.nlm.nih.gov/entrez/query.fcgi?db=pubmed&cmd=Retrieve&dopt=Abstract&list_uids=2679214&query_hl=7&itool=pubmed_ExternalLink.

U.S. Appl. No. 10/756,669, filed Jan. 12, 2004, Thambiratnam.

U.S. Appl. No. 11/131,108, filed May 16, 2005, Michaelis.

"Assistive Writing," AbilityHub.com (printed Apr. 11, 2005), available at http://www.abilityhub.com/speech/speech-Id.htm, 2 pages.

"Automatic Speech Recognition," Technology Access Program, AbilityHub.com (Fall 2002), available at http://tap.gallaudet.edu/SpeechRecog.htm, 2 pages.

"Contrasts in Pronunciation," (undated), available at http://www.bohemica.com/czechonline/reference/pronunciation/contrasts.htm, 2 pages.

"Inside Speech Recognition," (printed Apr. 11, 2005), available at http://fsug.org/usyd.edu.au/documentation/HOWTO/Speech-Recognition-HOWTO/inside..., 2 pages.

"Speech Recognition," (printed Apr. 11, 2005) available at http://murray.newcastle.edu.au/user/staff/speech/home_pages/tutorial_sr.html, 5 pages.

Arslan, Levent M., "Foreign Accent Classification in American English," thesis, pp. 1-200, Department of Electrical Computer Engineering, Duke University, 1996.

Arslan, Levent M., et al., "Language Accent Classification in American English," Robust Speech Processing Laboratory Department of Electrical Engineering, Durham, North Carolina, Technical Report RSPL-96-7(1996).

Hansen, John H.L., et al., "Foreign Accent Classification Using Source Generator Based Prosodic Features," IEEE Proc. ICASSP, vol. 1, Detroit U.S.A., (1995), pp. 836-839.

Hosom, John-Paul, et al., "Training Neural Networks for Speech Recognition," Center for Spoken Language Understanding, Oregon Graduate Institute of Science and Technology (Feb. 2, 1999), 51 pages.

Jackson, Philip J.B., et al., "Aero-Acoustic Modeling of Voiced and Unvoiced Fricatives Based on MRI Data," University of Birmingham and University of Southampton, (undated), 4 pages.

Kirriemuri, John, "Speech Recognition Technologies," TSW 03-03 (Mar. 2003), 13 pages.

Lamel, L.F., et al., "Language Identification Using Phone-based Acoustic Likelihoods," ICASSP-94.

Laramee, François Dominic, "Speech Interfaces for Games—Part 1: How Speech Recognition Words," GlGnews.com (2000), available at http://www.gignews.com/fdlspeech2.htm, 5 pages.

Loizou, Philip, "Speech Production and Perception," EE 6362 Lecture Notes (Fall 2000), pp. 1-30.

Markowitz, J., "Glossaries," available at http://www.jmarkowitz.com/glossary.html, 4 pages.

Michaelis, Paul Roller, "Speech Digitization and Compression," Avaya Laboratories (undated), pp. 1-5.

Noth, E., et al., "Research Issues for the Next Generation Spoken"; University of Erlangen-Nuremberg, Bavarian Research Centre for Knowledge-Based Systems, at http://www5.informatik.uni-erlangen.de/literature/psdir/1999/Noeth99:RIF.ps.gz, downloaded Feb. 10, 2003.

Pervasive, Human-Centered Computing, MIT Project Oxygen, MIT Laboratory for Computer Science, Jun. 2000.

Zue, Victor, "The MIT Oxygen Project," MIT Laboratory for Computer Science, Apr. 25-26, 2000.

Background for the above-captioned application (previously provided).

McCarthy, Caroline. "New cell phone to prevent drunk dialing." CNET News. Jun. 28, 2006. Accessed online Mar. 19, 2010. <http://news.cnet.com/8301-1 0784_3-6088879-7. html>.

Osburn, "What are symptoms of hypoglycemia?" Essortment.com, posted Nov. 27, 2005, accessed via Internet archive on Aug. 23, 2010 at http://web.archive.org/web/20051127014722/va.essortment.com/hypoglycemiasym_rjfc.htm, 2 pages.

Kawaguchi et al., "Development of a telenursing system for patients with chronic conditions," Journal of Telemedicine and Telecare, 2004, vol. 10, No. 4, pp. 239-244.

Black et al., "Implementing autonomy in a diabetes management system," Journal of Telemedicein and Telecare, 2005, vol. 11, Suppl. 1. pp. 6-8.

"Voice-dialgoue system eases diabetes monitoring," The British Journal of Healthcare Computing & Information Management, Oct. 2005, vol. 22, No. 8, p. 25.

Symptoms of Diabetes,' WrongDiagnosis.com, published on Jun. 27, 2003, accessed on Aug. 23, 2010 via Internet Archive at http://web.archive.org/web/20030627021518/http:/www.wrongd iagnosis.com/dld iabetes/symptoms. htm, 3 pages.

"Hypoglycemia," MedicineNet.com, published on Jan. 19, 2006, accessed on Aug. 23, 2010 via Internet Archive, at http://web.archive.org/web/20060119000857/http:/www.medicinenet.com/hypoglycemia/page2.htm, 3 pages.

"Hyperglycemia (High Blood Sugar)," University of Iowa Hopstials & Clinics, published on Mar. 23, 2006, accessed on Sep. 9, 2010 via Internet Archive at http://web.archive.Org/web/20060323081940/http://www. uihealthca reo com/topi cs/d iabetes/hyperg lycemia.html, 2 pages.

* cited by examiner ical embodiment of the present invention is
directed toward telephony devices, services and methods, and
more specifically, to handling of messages when a user is in an
impaired state or when a user selects a predefined profile.

BACKGROUND

Alcohol is consumed not only at home and in restaurants but also at sporting events and entertainment facilities, such as bars, nightclubs, discotheques, dance halls, concerts, and parties. The inevitable consequence of drinking too much alcohol is a condition known as intoxication. When an individual is intoxicated, his or her fine motor skills and mental functions are impaired leading to a variety of problems. The evils of drinking and driving are only too well known. A desirable alternative to drinking and driving is calling a cab or catching a ride with a friend or acquaintance. Unfortunately, intoxicated individuals are frequently unable to operate a phone and therefore to make a call to seek such assistance.

Another unfortunate consequence of intoxication is not well reasoned judgment. When intoxicated, individuals often make phone calls or send text messages to friends, fellow employees, and loved ones (or former loved ones) that they may later regret. Currently, one cellular service provider permits an individual to disable their cell phones for specified periods of time when the individual is planning on imbibing substantial quantities of alcohol.

Yet another problem with intoxication is that the intoxicated person typically is not aware that he or she is intoxicated. Without this knowledge, he or she will attempt to drive, with potentially fatal consequences. A mobile phone is currently available that includes a breath analyzer to detect alcohol.

SUMMARY

An exemplary embodiment of the present invention is generally directed to the reconfiguration of a communication device and/or other network node based on the user having a temporally limited, altered physical condition and the use of text and/or text patterns, to evaluate the physical state of the user and the handling of one or more messages.

In one configuration, the determination is effected by performing a breath analysis of the user. In other words, a breath analyzer, such as a breathalyzer, is preferably included in the user's telephone.

In another configuration, the determination can be an analysis of a message to determine the likelihood that the speaker has the target physical condition and/or a likely degree or severity of the target physical condition. The analysis analyzes, with reference to a baseline of the user, one or more of a number of errors (spelling and/or grammar) in the message, a response time, a non-fluency level associated with the message, a spell check of the message and recipient information associated with the message.

Additional disclosure related to speech analysis, which can also be used in a similar manner for analysis of messages, can be found in copending related U.S. patent application Ser. No. 11/508,442, which is incorporated herein by reference in its entirety. As discussed in this related application, in one configuration, the analysis is performed by comparing speech units in the utterance with corresponding baseline speech units from the user/speaker assuming that the user/speaker does not have the target physical condition, comparing speech units in the utterance with corresponding baseline speech units from the user/speaker assuming that the user/speaker has the target physical condition; and based on the comparative results of the prior steps, determining a level of confidence that the user/speaker has and/or does not have the target physical condition.

The network node can be a switch or server, for example, and first and second network node configurations include redirecting (e.g., to voice mail), blocking, and/or delaying selected incoming and/or outgoing contacts to and from the user. By way of illustration, the network node, in response to the altered physical state of the user, may enable an additional prompt when sending a text message input by the user while in the altered physical state, or inserting a time delay when sending a text message input by the user when in the altered physical state. The node can also automatically send a text message input by the user, while in the altered physical state, to a drafts folder instead of sending the message to the requested destination.

The communication device can be a telephone, laptop, personal computer, Personal Digital Assistant, for example, and the first and second user configurations include disabling one or more pre-selected telephone numbers, changing a size of a character font displayed by the communication device, changing a contrast between a background and icons/characters displayed by the communication device, enabling/disabling selected button tones of the communication device, changing loudness of a speaker of the communication device to permit the altered user to hear button tones caused by pressing a selected button of the communication device, enabling and/or disabling a feature/operation of the communication device, re-ordering a list of speed-dials or contacts associated with the user, and changing a message recognition algorithm.

The present invention can provide a number of advantages depending on the particular configuration. For example, it can prevent individuals from sending messages, that they later regret, to friends, fellow employees and loved ones. It can inexpensively provide the user with an indication of whether he or she is intoxicated and the degree of intoxication. Implementing the functionality in a switch or adjunct or as software in the communication device can be relatively inexpensive.

Included in an exemplary embodiment is user diagnostic functionality, which monitors and analyzes a subscriber's breath samples and/or messages to detect a corresponding voluntary physical state of the subscriber. Although the voluntary state is discussed with specific reference to alcohol intoxication, it may be any other voluntarily altered physical state, such as mental changes caused by drug consumption that can be detected by breath and/or message analysis. A message can be issued to the subscriber while using any of the internal and external communication devices as part of a contact, call, SMS, text message, e-mail, video message, or the like. The term "contact" or "call" as used herein is intended to include not only messaging but also non-telephonic communications, such as data transmissions such as electronic mail, voice-over-IP (VOIP), facsimile, etc., whether circuit-switched or packet-switched. When a selected (target) voluntary physical state is detected, the functionality takes appropriate actions, including reconfiguration the communication device and/or a network node other than the communication device (e.g., a switch and server). Reconfiguration may include automatically holding the message, disabling one or more pre-selected telephone numbers stored in the communication device and/or a network node (e.g., switch or server) (e.g., the telephone number of a fellow employee, supervisor, ex-spouse, etc.) so that the device is unable to contact the numbers without, for example, entry of a relatively complex authorization code and/or activation of a sequence of keys in a specific order and otherwise reconfiguring the phone from a first (user normal) mode to a second (user impaired) mode in which the phone operates a more user friendly manner given the voluntarily altered state of the user. Device reconfiguration to the second mode may include improving the legibility of the device's display screen through increasing the size of the character font and/or increasing the contrast between the background and the displayed icons/characters, enabling button tones and/or increasing the loudness of the speaker in the communication device to permit the altered user to hear button tones caused by pressing a selected button and/or enabling/disabling a feature/operation of the communication device, re-ordering the list of speed-dials or contacts, enabling a modified text recognition algorithm for specific recipients to overcome the speech impairment and permit the intoxicated user to interact with the communication device, redirecting an incoming call to a destination other than the communication device (e.g., a voice messaging server), blocking completely outgoing messaging from the communication device, enabling an additional user prompt when sending a text message input by the user (e.g., "are you sure that you want to send this message?"), inserting a time delay (e.g., 30 minutes) when sending a text message input by the user to give the user time to undo the message, sending a text message input by the user to the "drafts" folder instead of to the intended destination or reminding the user at a later time, for example after a determination that the impaired state has ceased, that a message was stored as a draft and querying whether it should now be sent.

The second mode may be reset to the first mode automatically by the passage of a selected time period, e.g., six hours, or by the detection of normal messaging by the formerly intoxicated user. Alternatively, the user can reset the device and/or node to the first mode by entry of a relatively complex authorization code and/or activation of a sequence of keys in a specific order.

When a person suffers from certain physical conditions, speech patterns, and resulting messages deviate, sometimes substantially, from the baseline speech pattern for the same person. For example, when a user takes a stimulant, he or she can become nervous or agitated. This can cause the person to type more rapidly. When the user takes a depressant (e.g., alcohol), he or she can have messages that are unclear, contain numerous repeat characters, etc. By comparing a set of characteristics of speech patterns against a baseline set of characteristics for the same speech patterns, the functionality can detect not only that the subscriber is likely suffering from a deviant or target physical condition but also the type and severity of the target physical condition.

The deviation from baseline will become greater, or worsen, in direct relation to the amount of stimulant/depressant consumed (e.g., the more intoxicated the person becomes).

These and other features and advantages of this invention are described in, or are apparent from, the following detailed description of the exemplary embodiments. The embodiments and configurations herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures wherein.

DETAILED DESCRIPTION

Figure 1:
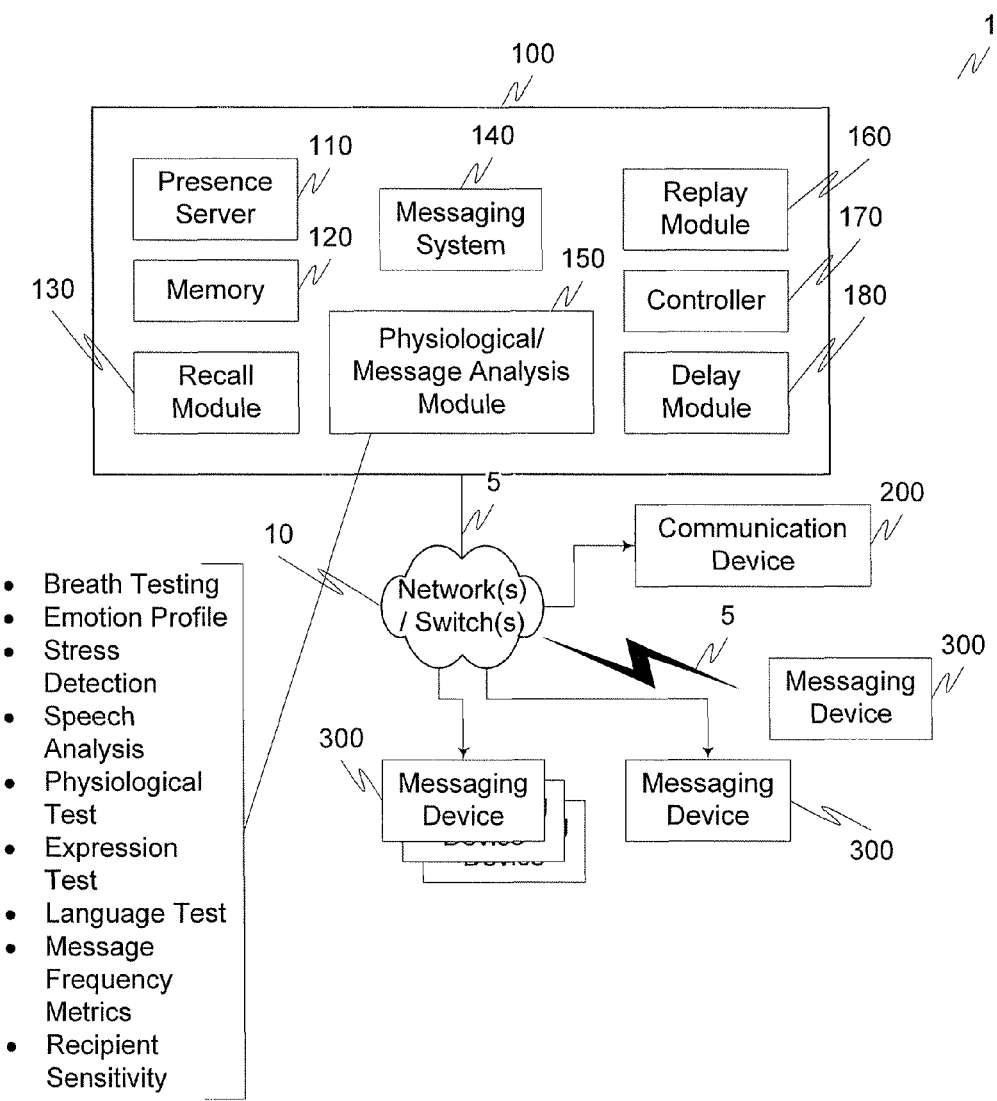
FIG. 1 illustrates an exemplary communications system according to this invention.

The exemplary embodiments of this invention will be described in relation to text message management in relation to an impaired condition. However, it should be appreciated, that in general, the systems and methods of this invention will work equally well for any type of messaging in any environment.

The exemplary systems and methods of this invention will also be described in relation to telecommunications systems and associated communication hardware, software and communication channels. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, such as a PBX or communications device, or collocated on a particular node of a distributed network, such as an analog and/or digital telecommunications network, a circuit-switched network and/or a packet-switched network. As will be appreciated from the following description, and for reasons of computational efficiency, the components of the system can be arranged at any location within a distributed network without affecting the operation of the system. For example, the various components can be located in a PBX, at one or more users' premises, or some combination thereof. Similarly, one or more functional portions of the system could be distributed between a telecommunications device(s) and an associated computing device.

Session Initiation Protocol or SIP (which is a simple signaling/application layer protocol for data network multimedia conferencing and telephony) can at least be used with the present invention to provide a degree of presence awareness in the communication network. Although other protocols are equally supportive of presence concepts, SIP provides an illustrative basis for the present invention.

A Session Initiation Protocol (SIP) is a signaling protocol that can be used for establishing sessions in an IP network. The session can be a simple two-way telephone call or, for example, could be a multi-party, multi-media conference session. SIP protocols are well known and allow the ability to establish sessions in a host of different service options such as voice-enriched e-commerce, web page click-to-dial, instant messaging, text messaging, email messaging, IP Centrex services and the like. In SIP, end systems and proxy servers can provide services such as call forwarding, callee and caller number delivery (where numbers can be any naming scheme such as a conventional URL format), personal mobility (the ability to reach a callee under a single, location-independent address even when the callee changes terminals), terminal-type negotiation and selection (e.g., a caller can be given a choice on how to reach the callee), mobile phone answering service, terminal capability negotiation, caller and callee authentication, blind and supervised call transfer, and invitations to multicast conferences. To provide these varied services, SIP uses a relatively simple message system, namely an "INVITE" message (with the caller's codec preferences) and an "OK" message (with the callee's codec preferences), and various software entities, namely registrars which maintain a map of the addresses of a given user at the current time, proxies which perform call routing, session management, user authentication, redirect functions, and routing to media gateways, redirect servers which perform a subset of forwarding functions, and SIP location servers which maintain user profiles and provide subscriber registration. "Registration" is a mechanism whereby a user's communication device registers with the network each time he or she comes online and individual profiles are accessed that specify information for routing based on a number of different criteria. An exemplary embodiment of the systems and methods of this invention could use SIP protocols to implement the functionality and messaging protocols described herein. Additionally, the determination as to whether a callee is available need not be limited to the identification of a busy signal, but could also be based on presence information or "do not disturb" status information available to, for example, a PBX. SIP could also be used in conjunction with the message recall functionality to assist with determining, for example, whether a message has been read and can be recalled, and recalling the message.

It should also be appreciated that the various links, including any communications channels and the various links 5, connecting the elements, can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. Further, it is to be noted that the term "a" or "an" entity refers to one or more of that entity. As such, the terms "a" (or "an"), "one or more" and "at least one" can be used interchangeably herein. It is also to be noted that the terms "comprising", "including" and "having" can be used interchangeably. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Also, while the flowcharts have been discussed in relation to a particular sequence of events, it should be appreciated that changes, additions and omissions to this sequence can occur without materially effecting the operation of the invention.

As will be appreciated, the portion of the telecommunications system 1 comprises other well known components which will not be discussed herein in detail. For example, the telecommunications system 1 can further include one or more telephony switch/media servers that can be any architecture for directing communications to one or more communication devices. The network 10 can and typically includes proxies, registrars, switches and routers that are well known. The communication devices 200 and 300 can be any communication device suitable for the network to which they are connected. For example, the communications devices can be any wired or wireless phone such as IP hardphones, IP softphones, Personal Digital Assistants or PDAs, Blackberry®, Treo®, Personal Computers or PCs, laptops, mobile phones, traditional PSTN type phones, cellular phones or any combination thereof.

FIG. 1 illustrates an exemplary communication system 1 according to this invention. In particular, the communication system 1 comprises a message management module 100, and one or more wired and/or wireless communications devices, such as communication device 200 and messaging device 300. The various elements are connected via one or more networks/switches and links 5. The message management system 100 comprises a presence server 110, a memory 120, a recall module 130, a messaging system 140, a psychological/message analysis module 150, a replay module 160, a controller 170 and a delay module 180.

In operation, it is not uncommon for a user to send an email or text message when they may not be in an acceptable state to do so, e.g. the user is tired, angry, stressed, or under the influence of alcohol. According to an exemplary aspect of this invention, if the user is found to be in an impaired state, or has selected a "delay" mode associated with the message management system 100, messages can be one or more of held until a later period of time, such as the next day, recalled, additional prompts provided to the user insuring the message really should be sent, and the like.

For example, and in accordance with an exemplary embodiment of the invention, the message management system 100 can determine before forwarding an email to a recipient whether or not the user is in an acceptable state to do so. If it is determined that the user is not in an acceptable state, then a "cooling off" period could be enforced before transmitting the message. This "cooling off" period could be implemented as an optional feature which could also be turned on or off and can also be overridden, if required. For example, if the user is sending a text message to an ex-lover while intoxicated, tired or angry, the user's state could be detected using, for example, one or more of the following exemplary techniques in conjunction with the physiological/message analysis module 150. These techniques include using an existing emotion profile, breath testing, stress detection methods such as message analysis, and expressions to detect emotion/fatigue detection, and the like. The user themselves may also manually configure message management system 100 to have the "cooling off" feature activated such as when they have the presence to set the feature before going out to a party or a big night out.

Replying to the cooling off period can be dependant on the reason for it being enforced, e.g. tired, angry, intoxicated, or like. The techniques could be configurable but can also be set dependant upon an existing user profile, e.g., the user is usually tired after 8 pm so the cooling off period should last until the following morning. Or, it is Friday or Saturday night and all messages sent these nights require a second authorization before being sent, etc. Another variation is to take into consideration the identity of the recipient, so if the message is to a boss or a senior manager, it could be managed differently than to a peer. When the cooling off period has elapsed, the user may be prompted to see whether they still want to send the email or message. In addition to the manually configuring for the cooling off period, an exemplary aspect of the invention can also automatically enforce a cooling off period when the user's state is deemed to be in a predetermined state.

To begin, one of the communications devices, such as messaging device 300, is detected to have sent a message by the messaging system 140. The messaging system 140, performs a check to see if the delayed mode has been selected. Alternatively, whether or not the delay mode is selected, and with the cooperation of the physiological/message analysis module 150, the system can automatically manage the delaying of one or more message based on an impaired state of the sender. If the delay mode is not selected, or it is determined that the sender is not in an impaired condition, the messaging system, in cooperation with the memory 120 and controller 170, forwards the message as usual.

However, if the delay mode has been selected by, for example, the user, or an impaired condition is detected, the messaging system 140, in cooperation with the physiological/message analysis module 150, delay module 180, and replay module 160 coordinate the handling of the message. For example, based on one or more of a profile and/or the state of a user, the message can be delayed for a period of time, in cooperation with the delay module 180, and then forwarded to the recipient.

Alternatively, or in addition, and in cooperation with the replay module 160, the message can be returned to the sender for approval. For example, approval may include obtaining a special instruction from the sender and, upon a receipt of this special instruction or authorization message sent. The message could also be deleted at this time by the sender if appropriate. Through special instruction or authorization may include, for example, a certain sequence of keystrokes, a password, or may be a simple yes/no query that is presented to the sender.

Alternatively, or in addition, the message can be handled based on a profile. For example, if the message is addressed to a certain group of individuals, messaging system 140, in cooperation with the physiological/message analysis module 150, can one or more of: delay sending the message for a period of time, request confirmation from the sender that the message should be sent, ask the sender if they are sure the message should be sent, require supplemental information before sending of the message, or the like.

Furthermore, in conjunction with the presence server 110, the messaging device could detect presence information as is well known. Based on, for example, presence information associated with the sender, in conjunction with the physiological/message analysis module 150, various actions can be taken, such as delay for a period of time before sending, request authorization before sending, or the like.

Another exemplary feature of this invention, which is particularly suitable for a SIP environment, is the ability to recall a message in association with the recall module 130. For example, once a message has been sent, the physiological/message analysis module 150 could query the sender whether they actually really wanted to send the message. Based on the sender's response, the physiological/message analysis module 150 can cooperate with the recall module 130 in an attempt to recall the message from a SIP-based recipient device.

Detection of an impaired condition by the physiological/message analysis module 150 can be based on one or more of breath testing, emotion profile, stress detection, speech analysis, physiological tests, expression tests, language tests, message frequency metrics, recipient sensitivity, and the like. For example, and in conjunction with the presence server 110, various criteria can be measured and analyzed to determined that, for example, the user may be in a bar. Then, for example in conjunction with the physiological/message analysis module 150, determination made that numerous typing mistakes were made in a message that is destined to be sent to an ex-lover. Analyzing this set of metrics, the physiological/message analysis module 150 can determine that based on these detected characteristics, the user is likely in an impaired state and the message should be at least delayed for a period of time.

Figure 2:
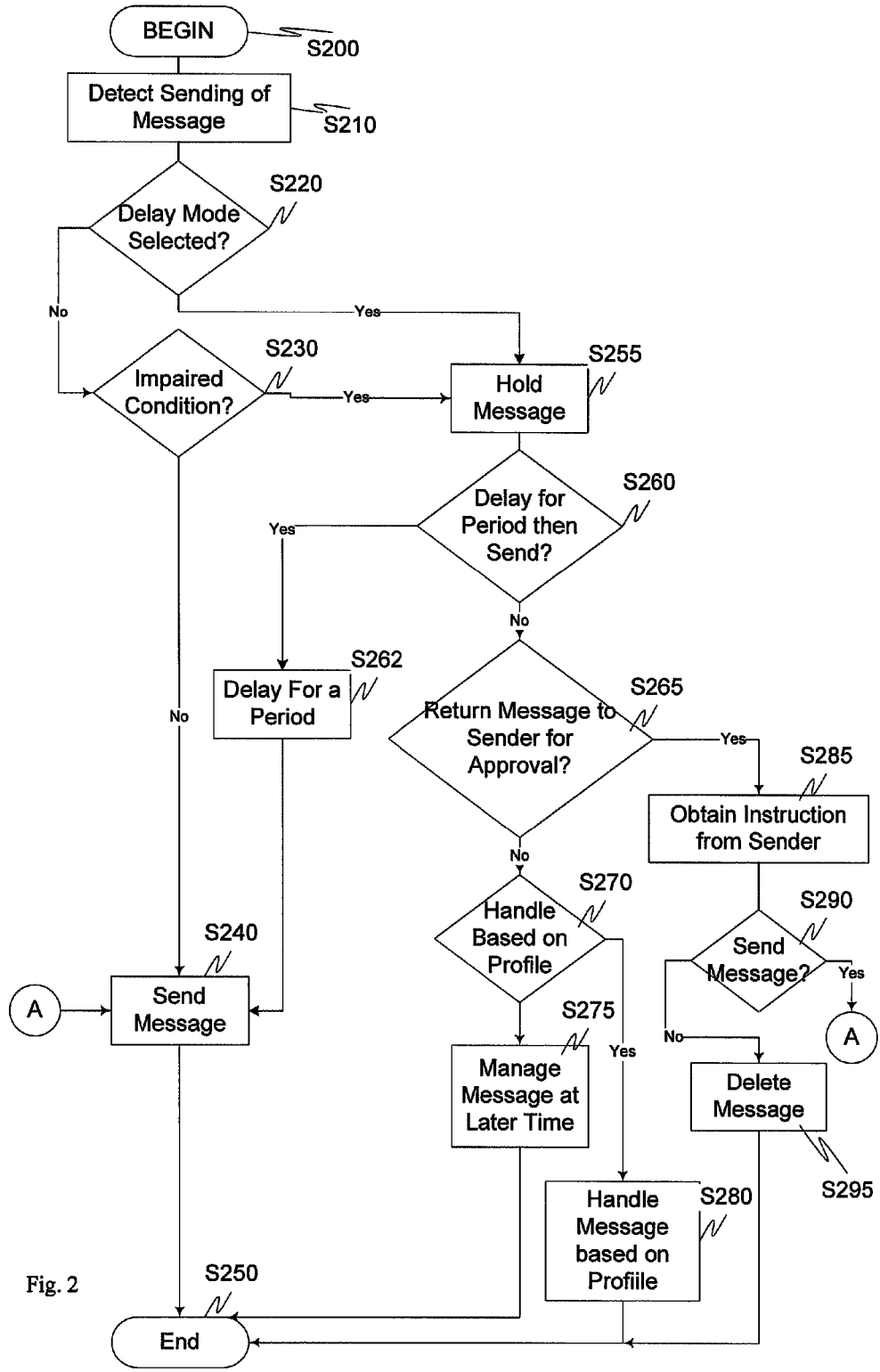
FIG. 2 illustrates an exemplary method for message management according to this invention.

FIG. 2 illustrates an exemplary method for handling a message in accordance with an exemplary embodiment of this invention. In addition to the features illustrated herein, the system can also recall a message and/or replay a message to a sender to, for example, allow them to better determine whether or not the message should be sent as originally indicated/addressed. For example, a SIP environment could be used to recall a sent message provided the recipient is also using a SIP based phone. For example, in SIP, the receiving device would know the ID of the sending device and the content of the message. The sending device could be used to identify the message and the desire to delete the message. A SIP server/recipient device could then be used to determine if it has been read, and deleting it if not read.

In particular, control begins in step S200 and continues to step S210. In step S210, the sending of the message is detected. Next, in step S220, a determination is made whether the delay mode has been selected. If the delay mode has been selected, control continues to step S255. If the delay mode has not been selected, control continues to step S230 where a determination is made whether an impaired condition exits. If an impaired condition does not exist, control continues to step S240 where the message is sent. Otherwise, control continues to step S255. The system could also alternatively reject the message and delete it. In step S255, the message is held pending further instruction from the sender. For example, in step S260, a determination is made whether message should simply be delayed for a period of time then sent. If the message is to be delayed and sent, control continues to step S262 where the message is delayed for a given period of time and then sent in step S240.

Alternatively, in step S265, a determination is made whether the message should be returned to the sender for approval. If the message is not to be returned to the sender, control continues to step S270 where a determination is made whether the message should be handled based on a profile. If the message is to be handled based on a profile, control continues to step S280 where the message is handled based on the profile. For example, if the message is to an employer or other class of recipients, the message can be handled in one way, where as if the message is to a buddy, the message can be handled in another way. Control then continues to step S250 where the control sequence ends.

Alternatively, if the message is not automatically handled based on a profile, control continues to step S275 where the message can be managed at a later time. For example, in this delay mode, all sent messages can be presented to the sender at a later time to read them and to determine whether they should be sent, edited, deleted, or the like.

If the message is to be returned to the sender for approval, control continues to step S285. In step S285, an instruction is obtained from the sender regarding how the message should be handled. Next, in step S290, a determination is made whether the message should be sent. If the message should be sent, control jumps to step S240. Otherwise, control continues to step S295 where the user can optionally delete the message. Control then continues to step S250 where the control sequence ends.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a telephone, mobile phone, PDA, a wired and/or wireless wide/local area network system, a satellite communication system, or the like, or on a separate programmed general purpose computer having a communications device(s) or in conjunction with any compatible communications protocol(s).

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems and methods for message management. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method for managing messages in a communications environment comprising:
    intercepting the sending of a message sent by a sender; and
    determining if a delay mode or an impaired condition mode is active, and
    when the delay mode or the impaired condition mode is not active, forwarding the message to one or more recipients;
    when the delay mode or the impaired condition mode is active, performing one or more of sending the message after a delay, returning the message to the sender for approval, managing the message based on a profile and holding the message for management at a later time.

2. The method of claim 1, further comprising obtaining approval from the sender for sending the message before sending.

3. The method of claim 1, further comprising determining if the sender is in an impaired state.

4. The method of claim 3, wherein the determining is based on one or more of breath testing, an emotion profile, stress detection, speech analysis, a physiological test, an expression test, a language test, a grammar test, a spelling test, message metrics and recipient sensitivity.

5. The method of claim 1, further comprising attempting to recall a sent message.

6. The method of claim 1, further comprising entering a delay before sending mode based on time and day information.

7. The method of claim 1, further comprising entering a delay before sending mode based on sender input.

8. The method of claim 1, further comprising requiring a specific key sequence from the sender before sending the message.

9. The method of claim 1, wherein the profile includes one or more of recipient information, metric information, and presence information.

10. The method of claim 1, wherein the message is one of a text message, SMS (Short Message Service) communication, multimedia message, audio message, video message, an instant message and a message including an image.

11. A communications management system that manages one or more messages in a communications environment comprising:
    a message management module that intercepts the sending of a message; and
    a messaging system, including a controller, that determines if a delay mode or an impaired condition mode is active, and
    when the delay mode or the impaired condition mode is not active, forwards the message to one or more recipients;
    when the delay mode or the impaired condition mode is active, performs one or more of sending the message after a delay, returns the message to the sender for approval, manages the message based on a profile and holds the message for management at a later time.

12. The system of claim 11, wherein approval from the sender is obtained before sending a message.

13. The system of claim 11, wherein the message management module further determines if the sender is in an impaired state.

14. The system of claim 13, wherein the determining is based on one or more of breath testing, an emotion profile, stress detection, speech analysis, a physiological test, an expression test, a language test, a grammar test, a spelling test, message metrics and recipient sensitivity.

15. The system of claim 11, further comprising attempting to recall a sent message.

16. The system of claim 11, further comprising a delay module adapted to allow entry of a delay before sending mode based on time and day information.

17. The system of claim 11, further comprising a delay module adapted to enter a delay before sending mode based on sender input.

18. The system of claim 11, further comprising a controller that requires a specific key sequence from the sender before sending the message.

19. The system of claim 11, wherein the profile includes one or more of recipient information, metric information, and presence information.

20. The system of claim 11, wherein the message is one of a text message, SMS (Short Message Service) communication, multimedia message, audio message, a video message, an instant message and a message including an image.

* * * * *